US012775251B2

(12) United States Patent
Kumar et al.

(10) Patent No.: US 12,775,251 B2
(45) Date of Patent: Oct. 27, 2026

(54) SYSTEM AND METHOD FOR OPTIMIZING NON-LINEAR CONSTRAINTS OF AN INDUSTRIAL PROCESS UNIT

(71) Applicant: JIO PLATFORMS LIMITED, Ahmedabad (IN)

(72) Inventors: Shailesh Kumar, Hyderabad (IN); Palash Sethi, Jabalpur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 314 days.

(21) Appl. No.: 18/699,979

(22) PCT Filed: Oct. 29, 2022

(86) PCT No.: PCT/IB2022/060436
§ 371 (c)(1),
(2) Date: Apr. 10, 2024

(87) PCT Pub. No.: WO2023/073655
PCT Pub. Date: May 4, 2023

(65) Prior Publication Data

US 2024/0419136 A1 Dec. 19, 2024

(30) Foreign Application Priority Data

Oct. 30, 2021 (IN) ............................. 202121049907

(51) Int. Cl.
*G05B 13/04* (2006.01)
*G05B 13/02* (2006.01)

(52) U.S. Cl.
CPC ......... *G05B 13/042* (2013.01); *G05B 13/027* (2013.01); *G05B 13/048* (2013.01)

(58) Field of Classification Search
None
See application file for complete search history.

(56) References Cited

U.S. PATENT DOCUMENTS

2006/0025961 A1 2/2006 Appel et al.
2011/0106277 A1 5/2011 Sayyar-Rodsari et al.
2023/0097885 A1 * 3/2023 Reynolds ............. G05B 13/042 700/29

OTHER PUBLICATIONS

International Search Report and Written Opinion for corresponding International Application No. PCT/IB2022/060436, mailed Feb. 23, 2023, 9 pages.

* cited by examiner

*Primary Examiner* — Ryan A Jarrett
(74) *Attorney, Agent, or Firm* — FINNEGAN, HENDERSON, FARABOW, GARRETT DUNNER LLP

(57) ABSTRACT

The present invention provides a robust and effective solution to an entity or an organization by enabling them to implement a system for facilitating creation of a digital twin of a process unit which can perform constrained optimization of control parameters to minimize or maximize an objective function. The system can capture non-linearities of the industrial process while the current Industrial Process models try to approximate non-linear process using linear approximation, which are not as accurate as Neural Networks. The proposed system can further create an end-to-end differentiable digital twin model of a process unit, and uses gradient flows for optimization as compared to other digital twin models that are gradient-free.

21 Claims, 10 Drawing Sheets

600

620

SYSTEM AND METHOD FOR OPTIMIZING NON-LINEAR CONSTRAINTS OF AN INDUSTRIAL PROCESS UNIT

FIELD OF INVENTION

The embodiments of the present disclosure generally relate to industrial process optimization using neural networks. More particularly, the present disclosure relates to a system and method for facilitating optimization of nonlinearities associated with an industrial process unit.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Adoption and implementation of automation technology is rapidly growing in several verticals of industry including Manufacturing, Refineries, Warehousing, Telecom, etc. Any automation framework defines: (1) Each process-unit and its input-to-output relationship, (2) How the process units interact with each other for the functioning of the end-to-end process. It should also allow to tune certain control-parameter inputs within each process unit so that a certain business objective for productivity/profitability etc. is met.

The current methodologies employ neural networks for performing non-linear control parameter optimization using various linear and non-linear optimization methods such as genetic search algorithms. Linear optimization for non-linear objective function gives accurate results only in a certain range while the non-linear methods only use the neural network in forward mode, that is, it only uses neural networks for calculating the outputs from the inputs. And the control parameters are changed further for optimization using various heuristics such as genetic search algorithms.

There is, therefore, a need in the art to provide a system and a method that enable improved ways of optimising non-linear process units, which are currently only being optimised using gradient-free linear methods which do not capture non linearities.

OBJECTS OF THE PRESENT DISCLOSURE

Some of the objects of the present disclosure, which at least one embodiment herein satisfies are as listed herein below.

It is an object of the present disclosure to provide a system and a method for facilitating a two stage ML based framework to perform constrained optimization on non-linear objective functions to find the optimal control-parameters for a given process-unit.

It is an object of the present disclosure to provide an approach that accurately captures its input-to-output relationship.

It is an object of the present disclosure to provide method that optimizes the control-parameter inputs towards a defined profit based objective function.

It is an object of the present disclosure to provide a system that enables creation of a digital twin of a process unit which can perform constrained optimization of control parameters to minimize or maximize an objective function.

It is an object of the present disclosure to provide a system that can capture non-linearities of the industrial process.

It is an object of the present disclosure to provide a system and method that creates an end-to-end differentiable digital twin model of a process unit, and uses gradient flows for optimization as compared to other digital twin models that are gradient-free.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for facilitating constrained optimization on non-linear attributes to find the optimal control-parameters for an industrial plant. The system may include one or more processors coupled with a memory that stores instructions which when executed by the one or more processors causes the system to: receive a set of input signals from one or more systems associated with an industrial plant; extract a first set of attributes from the set of input signals received, the first set of attributes pertaining to one or more finite constant parameters associated with the one or more systems. The system may further extract a second set of attributes from the set of input signals received, the second set of attributes pertaining to one or more control parameters associated with the one or more systems. A causality learning engine associated with the one or more processors may be configured to train the set of inputs received based on the first and the second set of attributes and a predefined dataset obtained from a knowledgebase associated with a centralized server operatively coupled to the industrial plant. The causality learning engine may be further configured to determine a trained model from the trained set of inputs received. Furthermore, a machine learning (ML) engine associated with the one or more processors may be configured to optimize the trained model to obtain an accurate output signal. The output signal herein corresponds to one or more optimal control-parameters for the industrial plant. Thus, the system, at least uses a two-stage or digital twin ML engines to provide an accurate output signal.

In an embodiment, the predefined dataset may be synthetically generated by the ML engine. In an embodiment, the ML engine may be configured to forward map the first and the second set of attributes with the output signal.

In an embodiment, the ML engine may be configured to change one or more control parameters for optimizing the trained model without changing the one or more constant parameters.

In an embodiment, the causality learning engine may be equipped with one or more neural networks to generate the trained model.

In an embodiment, the ML engine may be further configured to capture a linear and boundary constraints of the one or more control parameters of the industrial plant.

In an embodiment, the ML engine may be configured to use a backpropagation error to optimize the one or more control parameters.

In an embodiment, the ML engine may be further configured to calculate one or more gradients associated with the optimization with respect to the control parameters to minimise or maximise the optimization.

In an embodiment, the ML engine may be further configured to stop change in the one or more control parameters when the one or more systems associated with the industrial plant is optimized.

In an embodiment, the centralised server may include a database that may store the knowledgebase that may include a set of potential parameters or information associated with the industrial plant.

In an embodiment, the ML engine may be configured to predict one or more actual parameters associated with the optimized industrial plant and add it to the knowledgebase as a new field and write the one or more actual parameters into a destination dataset.

In an aspect, the present disclosure provides for a user equipment (UE) for facilitating constrained optimization on non-linear attributes to find the optimal control-parameters for an industrial plant. The UE may include an edge processor and a receiver, the edge processor being coupled with a memory that stores instructions which when executed by the edge processor causes the UE to: receive a set of input signals from one or more systems associated with an industrial plant; extract a first set of attributes from the set of input signals received, the first set of attributes pertaining to one or more finite constant parameters associated with the one or more systems. The UE may further extract a second set of attributes from the set of input signals received, the second set of attributes pertaining to one or more control parameters associated with the one or more systems. A causality learning engine associated with the processor may be configured to train the set of inputs received based on the first and the second set of attributes and a predefined dataset obtained from a knowledgebase associated with a centralized server operatively coupled to the industrial plant. The causality learning engine may be further configured to determine a trained model from the trained set of inputs received. Furthermore, a machine learning (ML) engine associated with the processor may be configured to optimize the trained model to obtain an accurate output signal. The output signal herein corresponds to one or more optimal control-parameters for the industrial plant. Thus, the UE, at least uses a two-stage or digital twin ML engines to provide an accurate output signal.

In an aspect, the present disclosure provides for a method for facilitating constrained optimization on non-linear attributes to find the optimal control-parameters for an industrial plant. The method may include the step of receiving, by one or more processors, a set of input signals from one or more systems associated with an industrial plant. In an embodiment, the one or more processors may be coupled with a memory that stores instructions. The method may further include the steps of extracting, by the one or more processors, a first set of attributes from the set of input signals received, the first set of attributes pertaining to one or more finite constant parameters associated with the one or more systems and extracting, by the one or more processors, a second set of attributes from the set of input signals received, the second set of attributes pertaining to one or more control parameters associated with the one or more systems. The method may further include the step of training, by a causality learning engine, the set of inputs received based on the first and the second set of attributes and a predefined dataset obtained from a knowledgebase associated with a centralized server operatively coupled to the industrial plant. In an embodiment, the causality learning engine may be associated with the one or more processors. The method may also include the step of determining, by the causality learning module, a trained model from the trained set of inputs received. Furthermore, the method may include the step of optimizing, by a Machine learning (ML) engine, the trained model to obtain an accurate output signal. In an embodiment, the ML engine may be associated with the one or more processors, and the output signal may correspond to one or more optimal control-parameters for the industrial plant.

Thus, from the above summary, it can be clearly seen that the objectives such as facilitating a two stage ML based framework to perform constrained optimization on non-linear objective functions to find the optimal control-parameters for a given process-unit, accurately captures its input-to-output relationship and optimizes the control-parameter inputs towards a defined profit based objective function. Since the system is designed to take any kind of input signal, the system can perfectly capture non-linearities of the industrial process. Thus, the system and method creates an end-to-end differentiable digital twin model of a process unit, and uses gradient flows for optimization as compared to other digital twin models that are gradient-free.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for facilitating creation of a digital twin of a process unit which can perform constrained optimization of control parameters to minimize or maximize an objective function. The system can capture non-linearities of the industrial process while the current Industrial Process models try to approximate non-linear process using linear approximation, which are not as accurate as Neural Networks. The proposed system can further create an end-to-end differentiable digital twin model of a process unit, and uses gradient flows for optimization as compared to other digital twin models that are gradient-free.

Figure 1:
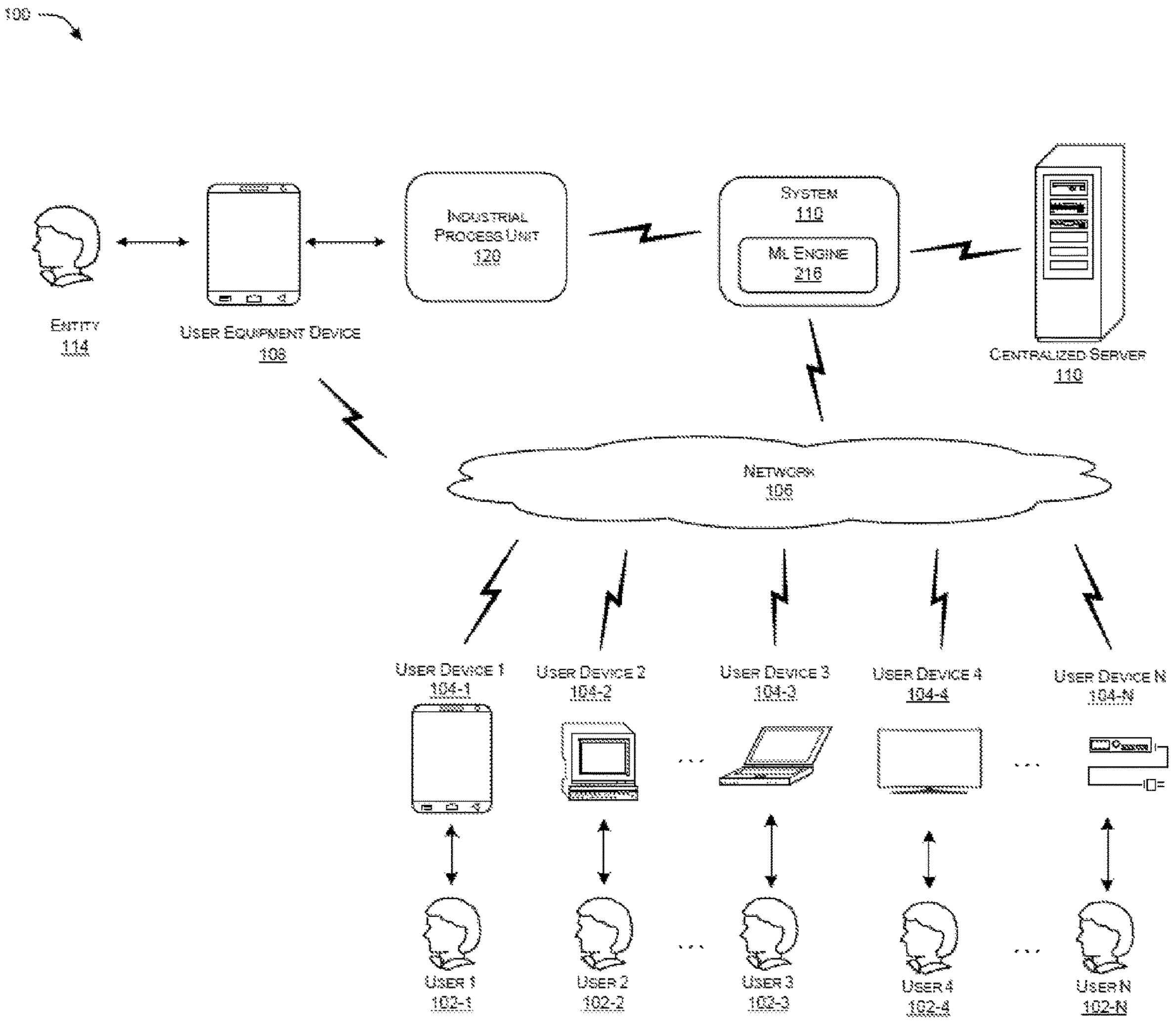
FIG. 1 illustrates an exemplary network architecture in which or with which the system of the present disclosure can be implemented, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example but not limitation, the exemplary architecture (100) may include a user (102) associated with a computing device (104), at least a network (106) and at least a centralized server (112). More specifically, the exemplary architecture (100) includes a system (110) equipped with a causality learning engine (214) and a machine learning (ML) engine (216) (illustrated in FIG. 2A) for facilitating constrained optimization on non-linear attributes to find the optimal control-parameters for an industrial process unit (120) (interchangeably referred to as industrial system or industrial process or industrial machine 120 or industrial plant 120).

As an example, and not by way of limitation, the user computing device (104) may be operatively coupled to the centralised server (112) through the network (106) and may be associated with the entity (114). Examples of the user computing devices (104) can include, but are not limited to a smart phone, a portable computer, a personal digital assistant, a handheld phone and the like.

The system (110) may further be operatively coupled to a second computing device (108) (also referred to as the user computing device or user equipment (UE) hereinafter) associated with the entity (114). The entity (114) may include a company, a lab facility, a business enterprise, or any other secured facility that may require features associated with a non-industrial unit (120). In some implementations, the system (110) may also be associated with the UE (108). The UE (108) can include a handheld device, a smart phone, a laptop, a palm top and the like. Further, the system (110) may also be communicatively coupled to the one or more first computing devices (104) via a communication network (106).

The system (110) may be configured to receive a set of input signals to be transmitted to the industrial process (120). In an exemplary embodiment, the set of input signals may include any finite constant parameters or control parameters associated with an industrial process. In a way of example and not as a limitation, the constants and the control parameters may be concatenated to produce an input vector which can be fed into the process unit to generate output vector. The constants and controls are contextual and depend on the process. An example of a process unit is a chemical unit in a refinery system. In a chemical unit, the set of control variables can be temperature, pressure, and feed flow, while the constants can be the composition of the input feed.

In an embodiment, the system (110) may be configured to extract a first set of attributes pertaining to the finite constant parameters associated with the one or more systems and further extract a second set of attributes from the set of input signals received, the second set of attributes pertaining to the control parameters associated with the one or more systems.

The system (110) may further be configured to train the set of inputs received by a causality learning engine (214) based on the first and the second set of attributes and a predefined dataset to obtain the trained model. The predefined dataset may pertain to a dataset that may be synthetically generated by but limited to a forward mapping the constant parameters and control parameters to the output.

The system (110) may then be configured to optimize the trained model to obtain the accurate output signal.

In an exemplary embodiment, during the process of optimization, only the control parameters (hereinafter interchangeably referred to as variables) may be changed while the constant parameters may be kept unchanged using but not limited to back propagation. For example, in this system, temperature, pressure and feed flow can be changed iteratively in a constrained manner to optimize and objective function such as profit.

In an exemplary embodiment, the causality learning engine (214) may be equipped with one or more neural networks that may be trained on the synthetically generated dataset that may be a forward mapping that maps constant parameters and control parameters to the output accurately. In an exemplary embodiment, the one or more neural networks can be trained in at least two ways such as but not limited to using pre-collected dataset and by sampling mathematical models which can simulate physical systems.

In an exemplary embodiment, a process objective function may be created which may capture a linear and boundary constraints of the control parameters of the industrial process (120). The control parameters may be iteratively optimised using but not limited to Adam Optimiser by using backpropagated error. The backpropagation error may start at an output layer and gradient of the process objective function may be calculated with respect to the control parameters. For example, the Adam optimiser may use the gradient values to change the control parameters to minimise or maximise the process objective function.

In an exemplary embodiment, the system may be configured to stop the change in the control parameters when the process objective function is optimised. Thus, the system (110) is configured to create an end-to-end differentiable digital twin model that includes the causality learning engine (214) and the ML engine (216) of the industrial plant (120).

The centralised server (112) may be associated with a database (210) that may store a knowledgebase having a set of potential parameters or information associated with the industrial process. The computing device (104) may be operatively coupled to the centralised server (112) through the network (106). In an exemplary embodiment, the knowledge base may be in the form of a hive table but not limited to the like.

In an embodiment, the system (110) may further configure the ML engine (216) to generate, through an appropriately selected machine learning (ML) model of the system in a way of example and not as limitation, a trained model configured to process and optimize the set of input signal received, and predict to read actual parameters associated with the optimized industrial process. The trained model may enable lookup with the faster storage database to get the optimized parameters and add it to the existing dataset as a new field and write it into a destination dataset.

In an embodiment, the computing devices (104) may include outdoor kiosks, foundry computers, personal computers, handheld mobiles, nettop, laptops and remote deployments but not limited to the like. The computing device (104) may communicate with the system (110) via set of executable instructions residing on any operating system, including but not limited to, Android™, IOS™, Kai OS™ and the like. In an embodiment, computing device (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) may not be restricted to the mentioned devices and various other devices may be used. A smart computing device may be one of the appropriate systems for storing data and other private/sensitive information.

In an exemplary embodiment, a network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2A:
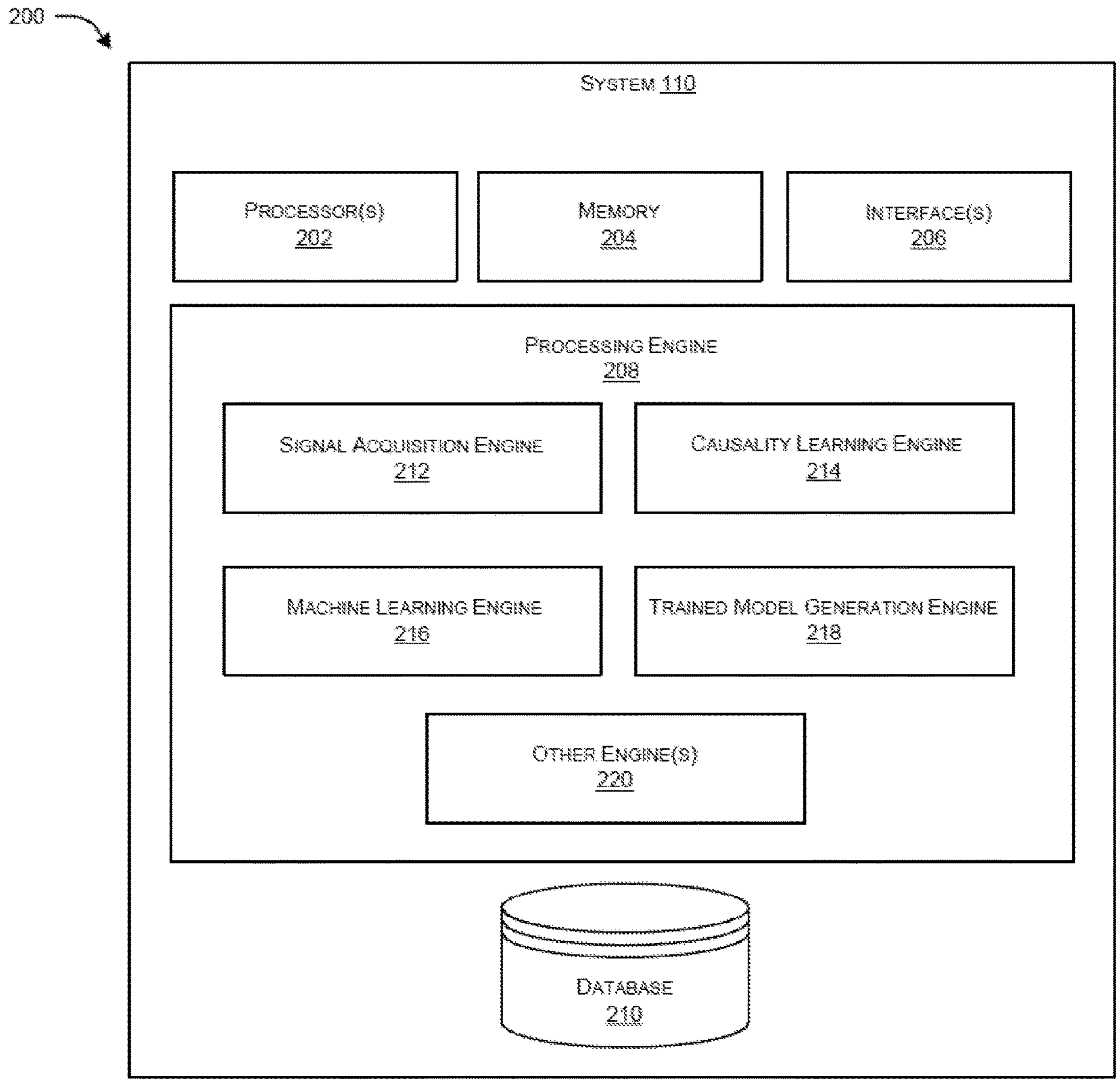
FIG. 2A illustrates an exemplary representation (200) of system (110), in accordance with an embodiment of the present disclosure.

In an embodiment, the system (110) may include one or more processors coupled with a memory, wherein the memory may store instructions which when executed by the one or more processors may cause the system to perform the generation of automated visual responses to a query. FIG. 2A with reference to FIG. 1, illustrates an exemplary representation of system (110) for facilitating constrained optimization on non-linear attributes of an industrial process (120) to find the optimal control-parameters for a given process-unit based on a machine learning based architecture, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 206 may also provide a communication pathway for one or more components of the system (110). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a signal acquisition engine (212), a causality learning engine (214), a machine learning (ML) engine (216), a trained model generation engine (218) and other engines (220).

In an embodiment, the signal acquisition engine (212) may be configured to acquire a set of input signals from one or more systems associated with an industrial plant; extract a first set of attributes from the set of input signals received, the first set of attributes pertaining to one or more finite constant parameters associated with the one or more systems and further extract a second set of attributes from the set of input signals received, the second set of attributes pertaining to one or more control parameters associated with the one or more systems.

In an embodiment, the causality learning engine (214) may be configured to train the set of inputs received based on the first and the second set of attributes and a predefined dataset obtained from a knowledgebase associated with a centralized server operatively coupled to the industrial plant. In an embodiment, the causality learning engine may be equipped with one or more neural networks such as the trained model generation engine (218) to generate the trained model.

In an embodiment, the trained model generation engine (218) along with the causality learning engine (214) may be further configured to determine a trained model from the trained set of inputs received. Furthermore, a machine learning (ML) engine associated with the one or more processors may be configured to optimize the trained model to obtain an accurate output signal. The output signal herein corresponds to one or more optimal control-parameters for the industrial plant.

In an embodiment, the predefined dataset may be synthetically generated by the ML engine (216). In an embodiment, the ML engine (216) may be configured to forward map the first and the second set of attributes with the output signal. The ML engine (216) may be further configured to change one or more control parameters for optimizing the trained model without changing the one or more constant parameters. The ML engine (216) may be further configured to capture a linear and boundary constraints of the one or more control parameters of the industrial plant and use a backpropagation error to optimize the one or more control parameters. The ML engine (216) may be further configured to calculate one or more gradients associated with the optimization with respect to the control parameters to minimise or maximise the optimization. In an embodiment, the ML engine (216) may be further configured to stop change in the one or more control parameters when the one or more systems associated with the industrial plant is optimized. In yet another embodiment, the ML engine (216) may be configured to predict one or more actual parameters associated with the optimized industrial plant and add it to the knowledgebase as a new field and write the one or more actual parameters into a destination dataset.

Figure 2B:
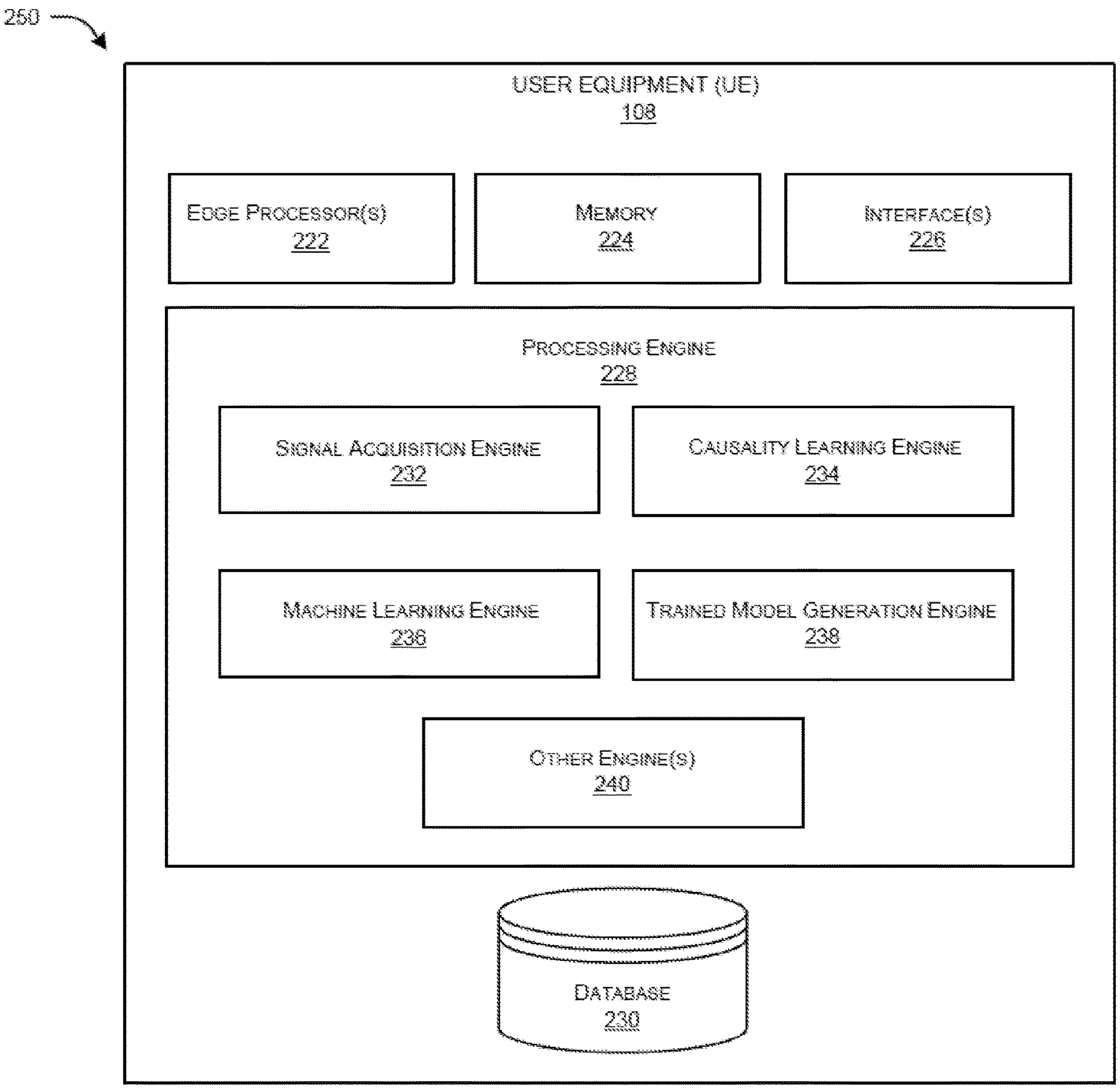
FIG. 2B illustrates an exemplary representation (250) of user equipment (UE) (108), in accordance with an embodiment of the present disclosure.

FIG. 2B illustrates an exemplary representation (250) of the user equipment (UE) (108), in accordance with an embodiment of the present disclosure. In an aspect, the UE (108) may comprise a processor (222). The processor (222) may be an edge based processor but not limited to it. The processor (222) may be implemented as one or more microprocessors, microcomputers, microcontrollers, digital signal processors, central processing units, logic circuitries, and/or any devices that process data based on operational instructions. Among other capabilities, the processor(s) (222) may be configured to fetch and execute computer-readable instructions stored in a memory (224) of the UE (108). The memory (224) may be configured to store one or more computer-readable instructions or routines in a non-transitory computer readable storage medium, which may be fetched and executed to create or share data packets over a network service. The memory (224) may comprise any non-transitory storage device including, for example, volatile memory such as RAM, or non-volatile memory such as EPROM, flash memory, and the like.

In an embodiment, the UE (108) may include an interface (s) 226. The interface(s) 206 may comprise a variety of interfaces, for example, interfaces for data input and output devices, referred to as I/O devices, storage devices, and the like. The interface(s) 206 may facilitate communication of the UE (108). Examples of such components include, but are not limited to, processing engine(s) 228 and a database (230).

The processing engine(s) (228) may be implemented as a combination of hardware and programming (for example, programmable instructions) to implement one or more functionalities of the processing engine(s) (228). In examples described herein, such combinations of hardware and programming may be implemented in several different ways. For example, the programming for the processing engine(s) (228) may be processor executable instructions stored on a non-transitory machine-readable storage medium and the hardware for the processing engine(s) (228) may comprise a processing resource (for example, one or more processors), to execute such instructions. In the present examples, the machine-readable storage medium may store instructions that, when executed by the processing resource, implement the processing engine(s) (228). In such examples, the UE (108) may comprise the machine-readable storage medium storing the instructions and the processing resource to execute the instructions, or the machine-readable storage medium may be separate but accessible to the UE (108) and the processing resource. In other examples, the processing engine(s) (228) may be implemented by electronic circuitry.

Figure 3:
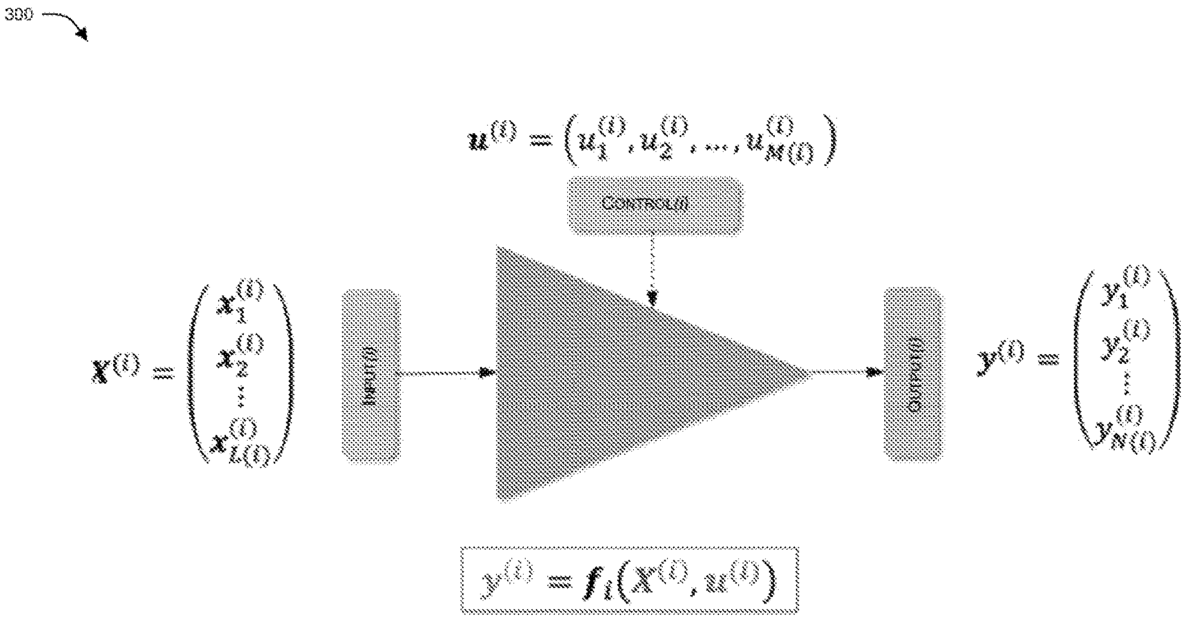
FIG. 3 illustrates exemplary block diagram representation depicting a Process unit, in accordance with an embodiment of the present disclosure.
Figure 4:
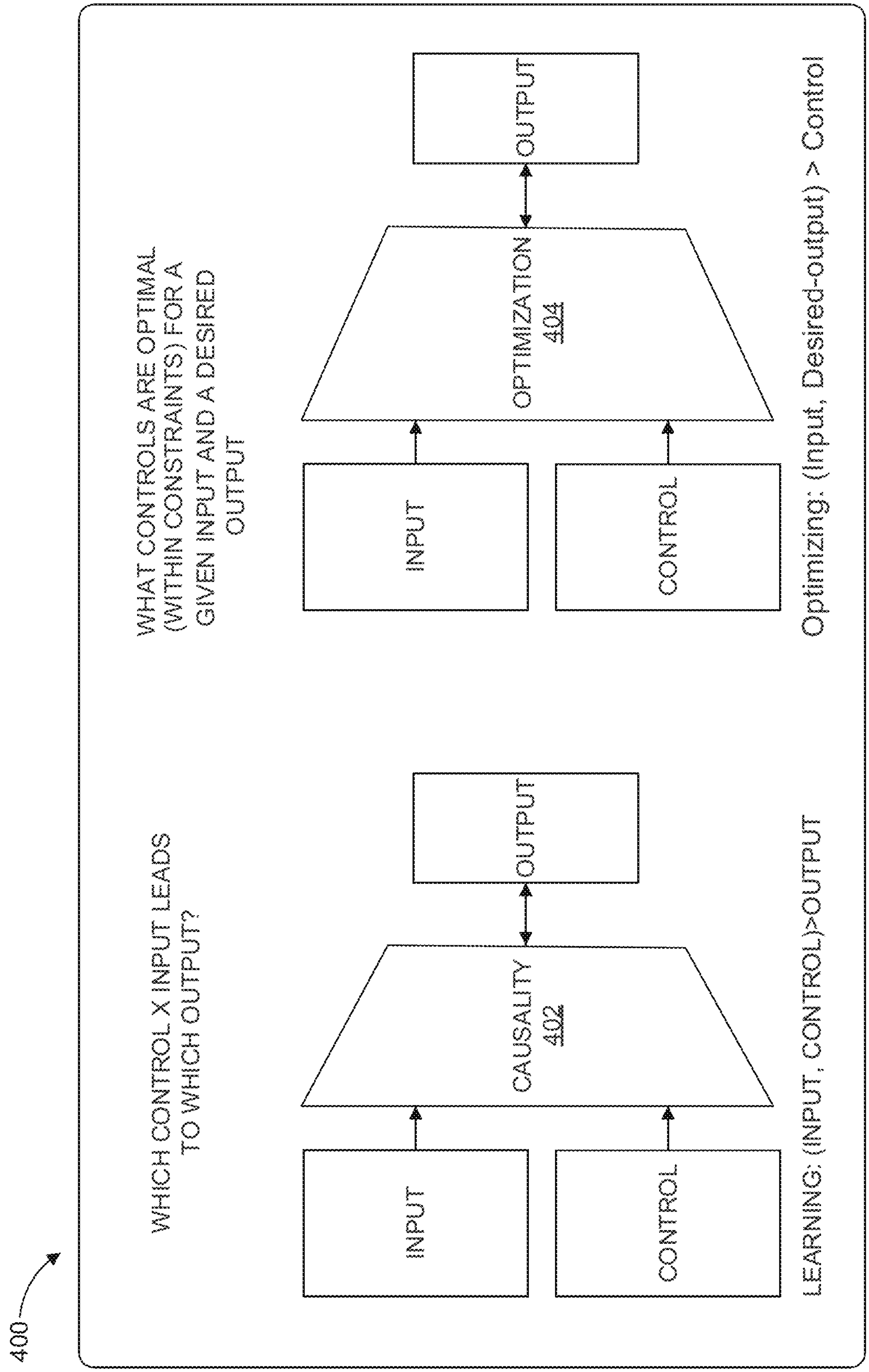
FIG. 4 illustrates an exemplary representation of a two-phase optimization architecture and its implementation, in accordance with an embodiment of the present disclosure.

FIG. 3 illustrates exemplary block diagram representation depicting a Process unit (300), in accordance with an embodiment of the present disclosure. As illustrated, in an aspect the process unit (300) may include parameters where, X is the constant vector u is the control vector y is the output vector and is a function of constant vector X and control vector u i is the iteration during the process of optimization X and u are concatenated and fed into the process unit to generate y FIG. 4 illustrates an exemplary representation of a two-phase optimization architecture and its implementation, in accordance with an embodiment of the present disclosure. As illustrated, in an aspect, the process of optimization of the process unit may include at least a two-step process: such as Causality Learning (402) and Control Parameters Optimization (404) using backpropagation. In the phase of causality learning (402), a neural network is trained on a synthetically generated dataset i.e., a forward mapping is learnt that maps constant parameters and control parameters to the output accurately. The Neural Networks can be trained in two ways: using pre-collected dataset and by sampling mathematical models which can simulate physical systems.

In an exemplary embodiment, the system may generate synthetic data by adaptive sampling. If the mathematical model of the physical process is not completely accurate, the synthetic data can be combined with process data from the physical process to generate a hybrid dataset. This hybrid dataset can be further used to fine tune the trained neural network.

Figure 5:
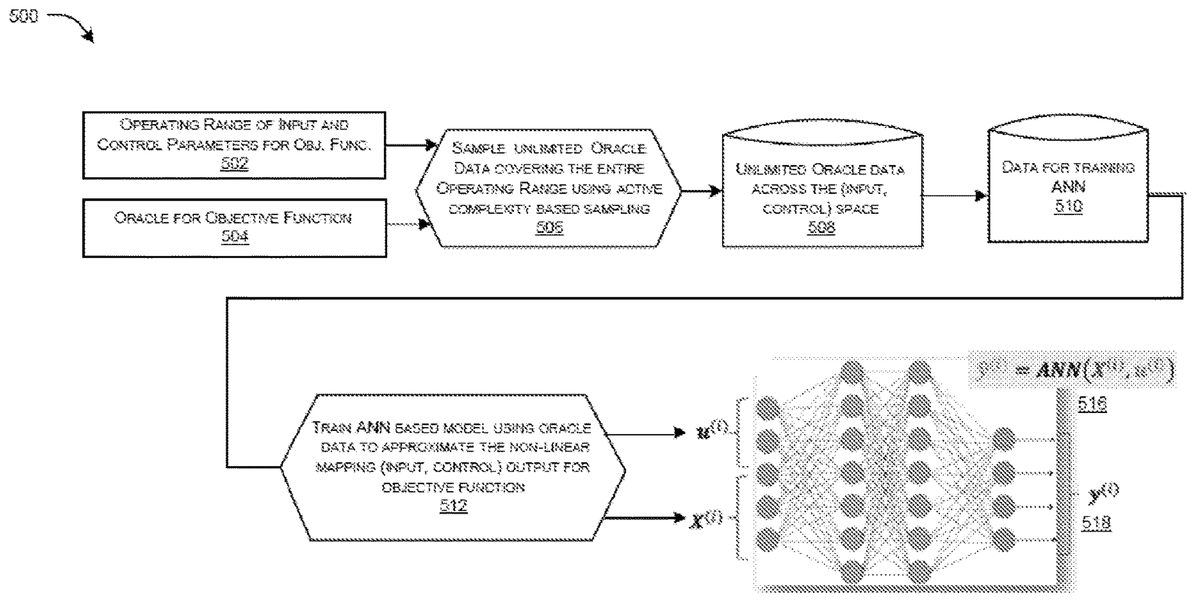
FIG. 5 illustrates an exemplary representation (500) of a flowchart of accurately training a neural network with synthetically generated data using active complexity-based sampling, in accordance with an embodiment of the present disclosure.

FIG. 5 illustrates an exemplary representation (500) of a flowchart of accurately training a neural network with synthetically generated data using active complexity-based sampling, in accordance with an embodiment of the present disclosure.

As illustrated, in an aspect, once the causality is learned by the Neural Network (NN), it is used to optimize controls for an objective function. The Objective function (504) can have multiple constraints for the controls, like, boundary constraints and linear constraints (502). Then synthetic data may be generated by adaptive sampling or active complexity-based sampling (506) to obtain an unlimited data across the input output space (508) that may be the data required for training an ANN (510). The Neural Networks (512 and 514) can be used to perform optimization by gradient-based methods. Modern neural network (NN) programming uses dynamic computational graphs for maintaining a record of gradients for the parameters of NN. These gradients can be used to perform gradient descent on the controls for optimizing an objective function. Multiple smaller objective functions can be combined together using Lagrange Multipliers to create a global objective function. These Lagrange Multipliers will act as hyper-parameters for the optimization pipeline.

Figure 6A:
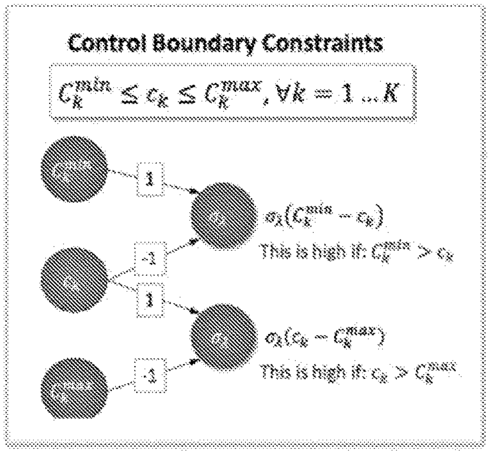
FIGS. 6A-6B illustrate exemplary representation of at least two constraint functions, in accordance with an embodiment of the present disclosure.
Figure 6B:
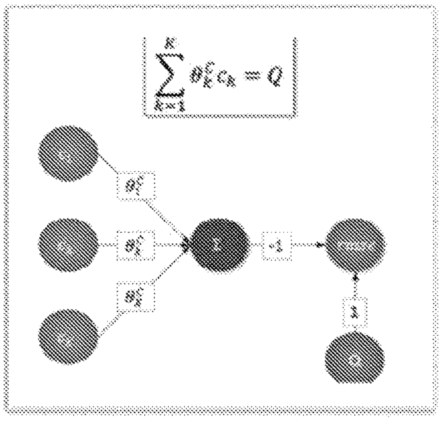

Following is an example of a generic objective function used to maximize profits while being limited by boundary and linear constraints on the controls side. Given a Product Revenue R. Input Cost S and Operation Cost O for a Digital Twin, Profit function J can be defined as $$J(f, c) = -(R(f, c) - S(f) - O(c)) - \lambda_{c1}L_{c1}(c) - \lambda_{F1}L_{F1}(f) - \lambda_{c2}L_{c2}(c) - \lambda_{F2}L_{F2}(f)$$

where, f, c are process control parameters $\lambda_{c1}$, $\lambda_{c2}$, $\lambda_{F1}$ and $\lambda_{F2}$ are Lagrange multipliers $L_{c1}$, $L_{c2}$, $L_{F1}$ and $L_{F2}$ are constraint functions for f and c respectively FIGS. 6A-6B illustrate exemplary representation of at least two constraint functions, in accordance with an embodiment of the present disclosure.

FIG. 6A shows an exemplary Boundary Constraint function where boundary constraints ($L_{c1}$, $L_{F1}$) function may provide a min-max range for the process controls to be optimised in, and are defined by $$L_{\frac{c1}{F1}}(\bar{c}) = \sum_k \sigma_\lambda\left(C_k^{min} - c_k, \alpha\right) + \sigma_\lambda\left(c_k - C_k^{max}, \alpha\right)$$

k is the number of variables in the control vector $$C_k^{min}$$

and $$C_k^{max}$$

are the min-max values for the variable $c_k$ $\sigma_2(x, \alpha)$ is a modified sigmoid function and is defined as $$\sigma_\lambda(x, \alpha) = \frac{1}{1 + e^{-\alpha * x}}$$

α is a hyperparameter whose value is at least 500 but not limited to it.

FIG. 6B illustrates a linear constraint function constraints the process control variables to follow a linear constraint and is defined as $$L_{\frac{c2}{F2}} = \sum_k RMSE(Q - \theta_k c_k)$$

where:

RMSE is the root mean square error function

Q is a constant $\theta_k$ is the coefficient of $c_k$

Figure 7:
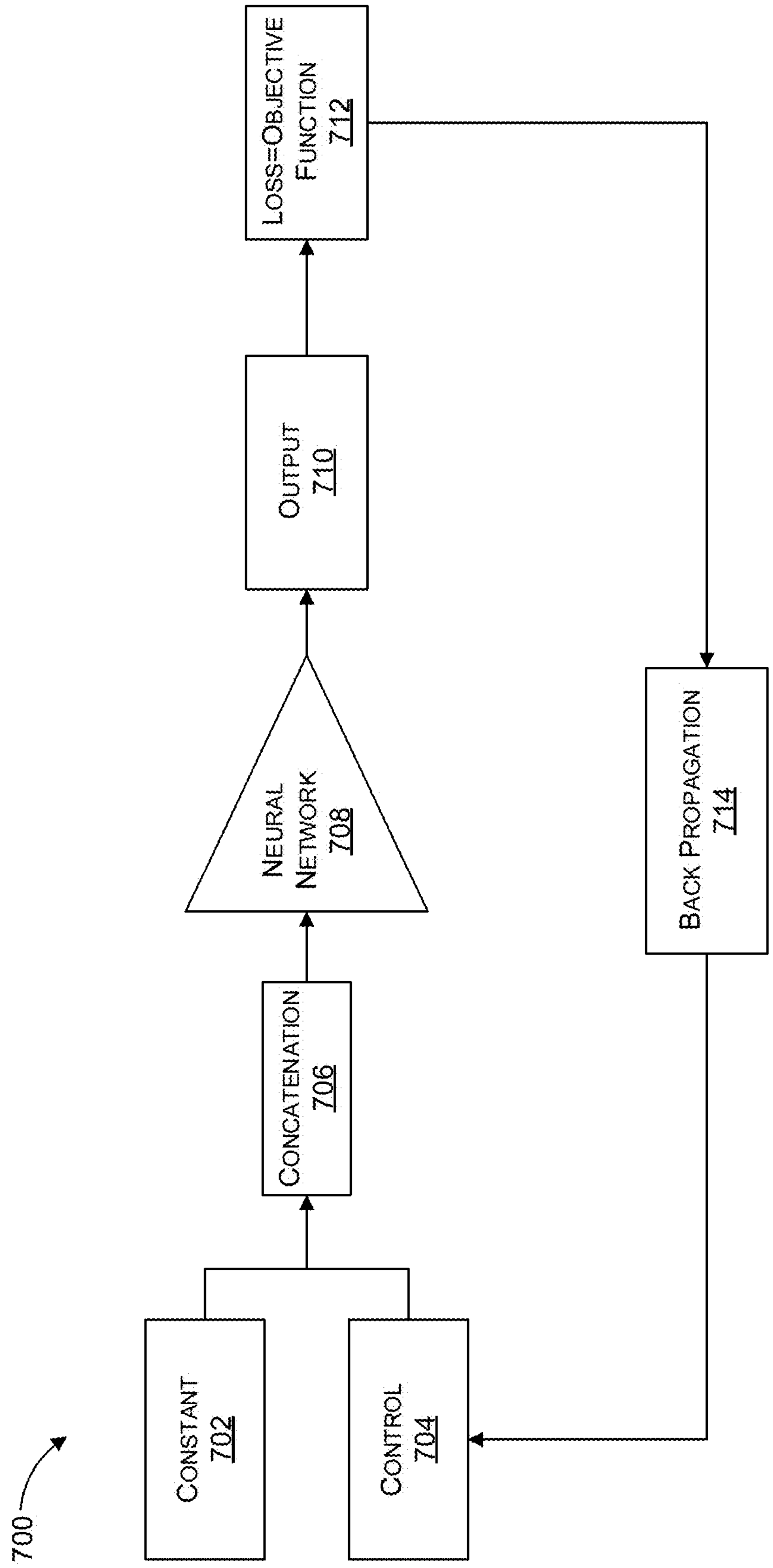
FIG. 7 illustrates an exemplary representation (700) of a workflow of a process control parameter optimization system and its implementation, in accordance with an embodiment of the present disclosure.

FIG. 7 illustrates an exemplary representation (700) of a workflow of a process control parameter optimization system and its implementation, in accordance with an embodiment of the present disclosure. As illustrated, the Process Control Parameter Optimization may be performed once the objective function may be formulated and includes the constraint functions such as the constants (702) and control parameters (704) that may be concatenated (706) and passed on to a neural network (708) to obtain the required output (710) from which an objective function is calculated (712) which may be the Loss to be backpropagated (714) is the objective function.

For example, given constraints can be

PRICE of all outputs

COST of all inputs

Trained Neural Network

Initial value of input $\bar{f}_0$ and control $\bar{c}_0$ parameters

In an exemplary embodiment, optimization of feed and control using gradient ascent may include the following steps.

Do a forward pass for the current $\bar{f}_t$ and $\bar{c}_t$ and estimate profit=Profit($\bar{f}_t$, $\bar{c}_t$)

The objective function is calculated

Loss to be backpropagated is the objective function.

This error DOES NOT update any of the weights in the already trained neural network This error propagates ALL THE WAY to the control vectors We update the control vectors based on this backpropagated error using Adam Optimizer If maximum percentage change in control/input parameter is <threshold, then stop Otherwise go to step 1

Figures 8A, 8B, 8C:
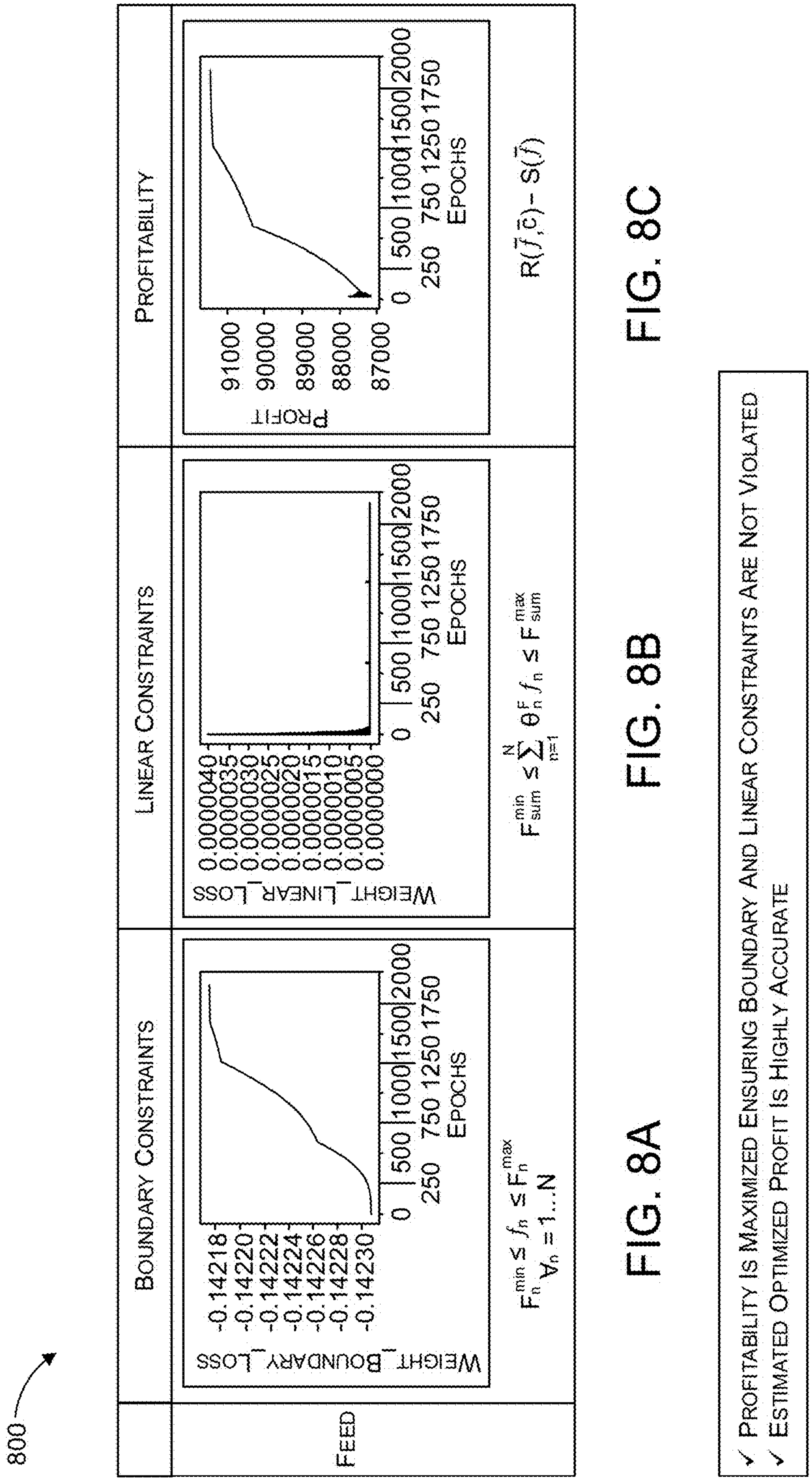
FIGS. 8A-8C illustrate exemplary representations of results and analysis associated with the proposed method and system, in accordance with an embodiment of the present disclosure.

FIGS. 8A-8C illustrate exemplary representations of results and analysis associated with the proposed method and system, in accordance with an embodiment of the present disclosure. FIG. 8A, FIG. 8B and FIG. 8C show that profitability is maximised ensuring boundary and linear constraints are not violated and estimated optimized profit is highly accurate.

Figure 9:
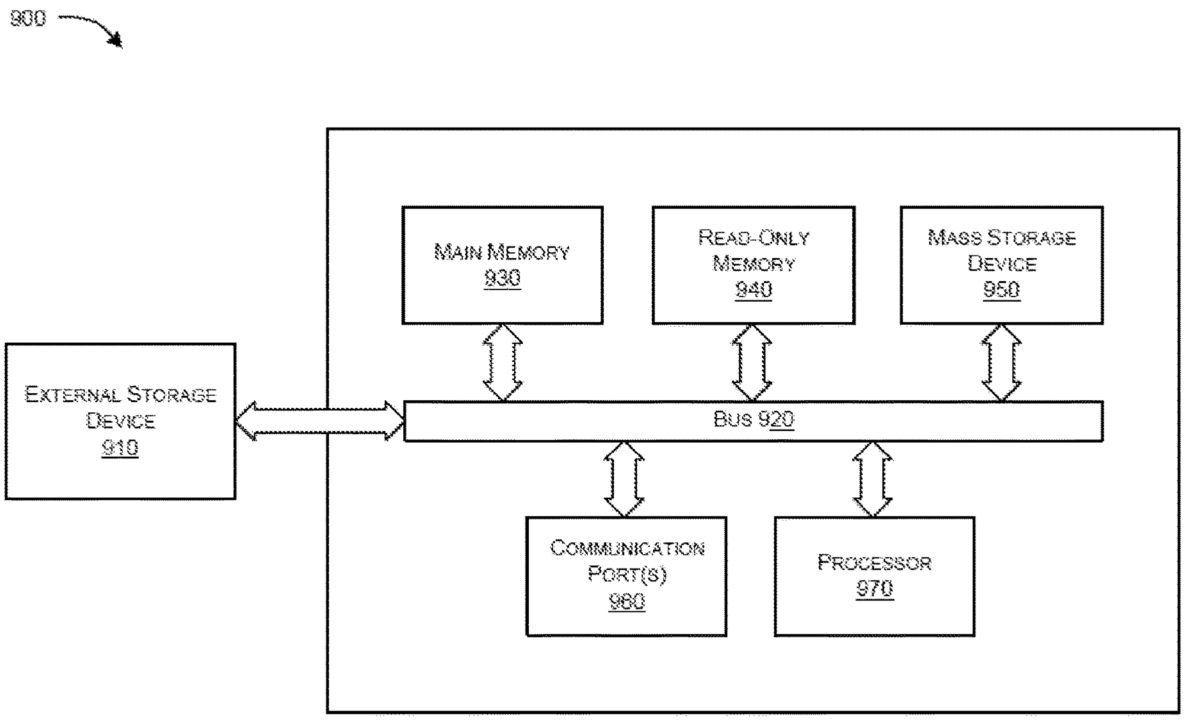
FIG. 9 illustrates an exemplary computer system in which or with which embodiments of the present invention can be utilized in accordance with embodiments of the present disclosure.

FIG. 9 illustrates an exemplary computer system in which or with which embodiments of the present invention can be utilized in accordance with embodiments of the present disclosure. As shown in FIG. 9, computer system (900) can include an external storage device (910), a bus (920), a main memory (930), a read only memory (940), a mass storage device (970), communication port (960), and a processor (970). A person skilled in the art will appreciate that the computer system may include more than one processor and communication ports. Processor (970) may include various modules associated with embodiments of the present invention. Communication port (960) may be chosen depending on a network, or any network to which computer system connects. Memory (930) can be Random Access Memory (RAM), or any other dynamic storage device commonly known in the art. Read-only memory (940) can be any static storage device(s) e. Mass storage (950) may be any current or future mass storage solution, which can be used to store information and/or instructions.

Bus (920) communicatively couples processor(s) (970) with the other memory, storage and communication blocks.

Optionally, operator and administrative interfaces, e.g. a display, keyboard, joystick and a cursor control device, may also be coupled to bus (920) to support direct operator interaction with a computer system. Other operator and administrative interfaces can be provided through network connections connected through communication port (960) . . . . Components described above are meant only to exemplify various possibilities. In no way should the aforementioned exemplary computer system limit the scope of the present disclosure.

Thus, the present disclosure provides a unique and inventive solution for optimising non-linear process units, which are currently only being optimized using gradient-free linear methods which do not capture non linearities. An optimization system/model using ANN helps to manage operations in its true nature of state, capturing dynamic interactions of all the measured variables in input and output space. Using such system in plant operations may provide maximum productivity and efficiency from its assets.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Disclosure

The present disclosure provides a system and a method for performing constrained optimization on non-linear objective functions to find the optimal control-parameters for a given process-unit.

The present disclosure provides a system and a method that optimizes the control-parameter inputs towards a defined profit based objective function.

The present disclosure provides a system and a method that can capture non-linearities of the industrial process.

The present disclosure provides a system and a method system and method that creates an end-to-end differentiable digital twin model of a process unit, and uses gradient flows for optimization as compared to other digital twin models that are gradient-free.

We claim:

1. A system for facilitating constrained optimization on non-linear attributes to determine one or more optimal control-parameters for an industrial plant, said system comprising:

one or more processors coupled with a memory, wherein said memory stores instructions which when executed by the one or more processors causes said system to:

receive a set of input signals from one or more systems associated with the industrial plant;

extract a first set of attributes from the set of input signals received, the first set of attributes pertaining to one or more finite constant parameters associated with the one or more systems;

extract a second set of attributes from the set of input signals received, the second set of attributes pertaining to one or more control parameters associated with the one or more systems;

train, by using a causality learning engine, using the set of inputs received based on the first and the second set of attributes and a predefined dataset obtained from a knowledgebase associated with a centralized server operatively coupled to the industrial plant, wherein the causality learning engine is operatively coupled with the one or more processors;

generate, a trained model from the trained set of inputs received; and optimize, by using a Machine learning (ML) engine, the trained model to obtain an accurate output signal, wherein the ML engine is operatively coupled with the one or more processors, wherein the output signal corresponds to the one or more optimal control-parameters for the industrial plant.

2. The system as claimed in claim 1, wherein the ML engine synthetically generates the predefined dataset and, wherein the ML engine is configured to forward map the first and the second set of attributes with the output signal.

3. The system as claimed in claim 1, wherein the ML engine is configured to change one or more control parameters for optimizing the trained model without changing the one or more constant parameters.

4. The system as claimed in claim 1, wherein the causality learning engine is equipped with one or more neural networks to generate the trained model.

5. The system as claimed in claim 1, wherein the ML engine is further configured to capture a linear and boundary constraints of the one or more control parameters of the industrial plant.

6. The system as claimed in claim 5, wherein the ML engine is further configured to use a back propagation error to optimize the one or more control parameters.

7. The system as claimed in claim 6, wherein the ML engine is further configured to calculate one or more gradients associated with the optimization with respect to the control parameters to minimise or maximise the optimization.

8. The system as claimed in claim 6, wherein the ML engine is further configured to prevent change in the one or more control parameters when the one or more systems associated with the industrial plant are optimized.

9. The system as claimed in claim 6, wherein a centralised server operatively coupled to the system is associated with a database that stores the knowledgebase, wherein the knowledgebase comprises a set of potential parameters or information associated with the industrial plant.

10. The system as claimed in claim 1, wherein the ML engine is configured to predict one or more actual parameters associated with the optimized industrial plant and add it to the knowledgebase as a new field and write the one or more actual parameters into a destination dataset.

11. A user equipment (UE) for facilitating constrained optimization on non-linear attributes to determine one or more optimal control-parameters for an industrial plant, said UE comprising:

an edge processor and a receiver, the edge processor coupled with a memory, wherein said memory stores instructions which when executed by the edge processor causes said UE to:

receive a set of input signals from one or more systems associated with the industrial plant;

extract a first set of attributes from the set of input signals received, the first set of attributes pertaining to one or more finite constant parameters associated with the one or more systems;

extract a second set of attributes from the set of input signals received, the second set of attributes pertaining to one or more control parameters associated with the one or more systems;

train, by using a causality learning engine, using the set of inputs received based on the first and the second set of attributes and a predefined dataset obtained from a knowledgebase associated with a centralized server operatively coupled to the industrial plant, wherein the causality learning engine is operatively coupled with the processor;

generate, a trained model from the trained set of inputs received; and optimize, by using a Machine learning (ML) engine, the trained model to obtain an accurate output signal, wherein the ML engine is operatively coupled with the processor, wherein the output signal corresponds to the one or more optimal control-parameters for the industrial plant.

12. A method for facilitating constrained optimization on non-linear attributes to find the optimal control-parameters for an industrial plant, said method comprising:

receiving, by one or more processors, a set of input signals from one or more systems associated with an industrial plant, wherein the one or more processors is coupled with a memory, wherein said memory stores instructions which executed by the one or more processors;

extracting, by the one or more processors, a first set of attributes from the set of input signals received, the first set of attributes pertaining to one or more finite constant parameters associated with the one or more systems;

extracting, by the one or more processors, a second set of attributes from the set of input signals received, the second set of attributes pertaining to one or more control parameters associated with the one or more systems;

training, by using a causality learning engine, the set of inputs received based on the first and the second set of attributes and a predefined dataset obtained from a knowledgebase associated with a centralized server operatively coupled to the industrial plant, wherein the causality learning engine is associated with the one or more processors;

generating, by the causality learning module, a trained model from the trained set of inputs received; and optimizing, by using a Machine learning (ML) engine, the trained model to obtain an accurate output signal, wherein the ML engine is associated with the one or more processors, wherein the output signal corresponds to one or more optimal control-parameters for the industrial plant.

13. The method as claimed in claim 12, wherein the predefined dataset is synthetically generated by the ML engine, wherein the method further comprises the step of forward mapping, by the ML engine, the first and the second set of attributes with the output signal.

14. The method as claimed in claim 12, wherein the method further comprises the step of changing, by the ML engine, one or more control parameters for optimizing the trained model without changing the one or more constant parameters.

15. The method as claimed in claim 12, wherein the causality learning engine is equipped with one or more neural networks to generate the trained model.

16. The method as claimed in claim 12, wherein the method further comprises the step of capturing, by the ML engine, a linear and boundary constraints of the one or more control parameters of the industrial plant.

17. The method as claimed in claim 16, wherein the method further comprises the step of using, by the ML engine, a back propagation error to optimize the one or more control parameters.

18. The method as claimed in claim 17, wherein the method further comprises the step of calculating, by the ML engine, one or more gradients associated with the optimization with respect to the control parameters to minimise or maximise the optimization.

19. The method as claimed in claim 17, wherein the method further comprises the step of preventing, by the ML engine, change in the one or more control parameters when the one or more methods associated with the industrial plant is optimized.

20. The method as claimed in claim 12, wherein a centralised server operatively coupled to the system is associated with a database that stores the knowledgebase, wherein the knowledgebase comprises a set of potential parameters or information associated with the industrial plant.

21. The method as claimed in claim 12, wherein the method further comprises the step of:

predicting, by the ML engine, one or more actual parameters associated with the optimized industrial plant and add it to the knowledgebase as a new field and write the one or more actual parameters into a destination dataset.

* * * * *